United States Patent
Hoshina

(10) Patent No.: US 10,157,241 B2
(45) Date of Patent: Dec. 18, 2018

(54) INFORMATION PROCESSING DEVICE AND INFORMATION PROCESSING METHOD

(75) Inventor: Takeshi Hoshina, Yokohama (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 270 days.

(21) Appl. No.: 14/369,862

(22) PCT Filed: Jan. 18, 2012

(86) PCT No.: PCT/JP2012/050974
§ 371 (c)(1),
(2), (4) Date: Jun. 30, 2014

(87) PCT Pub. No.: WO2013/108381
PCT Pub. Date: Jul. 25, 2013

(65) Prior Publication Data
US 2014/0351279 A1 Nov. 27, 2014

(51) Int. Cl.
*G06F 17/40* (2006.01)
*G06F 17/30* (2006.01)
*G06F 11/07* (2006.01)

(52) U.S. Cl.
CPC .... *G06F 17/30994* (2013.01); *G06F 11/0739* (2013.01); *G06F 11/0793* (2013.01)

(58) Field of Classification Search
CPC .................................................. G06F 11/0739
See application file for complete search history.

(56) References Cited

U.S. PATENT DOCUMENTS

| 7,277,809 B1* | 10/2007 | DeWitt, Jr. | G01P 21/02 340/901 |
|---|---|---|---|
| 2005/0188357 A1 | 8/2005 | Derks et al. | |
| 2009/0235242 A1 | 9/2009 | Kawaguchi | |
| 2011/0128311 A1* | 6/2011 | Wakatsuki | G09G 3/22 345/691 |

(Continued)

FOREIGN PATENT DOCUMENTS

| JP | 3-63838 | 3/1991 |
|---|---|---|
| JP | 9-81415 | 3/1997 |

(Continued)

OTHER PUBLICATIONS

International Search Report dated Feb. 14, 2012, in PCT/JP12/050974 filed Jan. 18, 2012.

*Primary Examiner* — Neveen Abel Jalil
(74) *Attorney, Agent, or Firm* — Oblon, McClelland, Maier & Neustadt, L.L.P.

(57) ABSTRACT

In order to dynamically perform operation verification for each function of a program that is being run, a vehicle-mounted information processing section (22) performs operation verification of a function provided on the basis of the execution of a distribution program (141) by a computation section (23). Verification data (151) to be provided by the function is stored in a vehicle-mounted storage device (30). Operation verification for a function provided on the basis of the execution of the distribution program (141) by the computation section (23) is carried out on the basis of comparison of display data (Pd) that is generated on the basis of the execution of the distribution program (141) with verification data (151) that is stored in the vehicle-mounted storage device (30).

13 Claims, 5 Drawing Sheets

(56) References Cited

U.S. PATENT DOCUMENTS

| | | | |
|---|---|---|---|
| 2011/0227942 A1* | 9/2011 | Fujimoto | B60K 35/00 345/619 |
| 2011/0251768 A1* | 10/2011 | Luo | B60W 30/12 701/70 |
| 2011/0293140 A1* | 12/2011 | Wagner | G06K 9/00624 382/103 |
| 2013/0082874 A1* | 4/2013 | Zhang | G01S 5/0072 342/357.31 |

FOREIGN PATENT DOCUMENTS

| | | |
|---|---|---|
| JP | 11-338736 | 12/1999 |
| JP | 2004-42683 | 2/2004 |
| JP | 2005-251172 | 9/2005 |
| JP | 2007-179347 | 7/2007 |
| JP | 2008-234117 | 10/2008 |
| JP | 2009-187377 | 8/2009 |

\* cited by examiner

Fig.6(a) Fig.6(b) Fig.6(c)
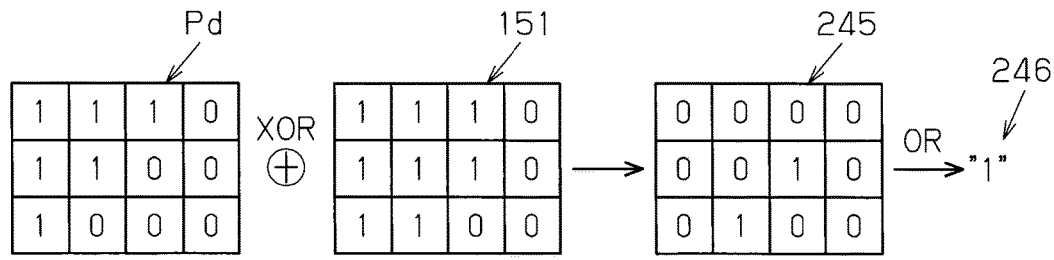
Fig.7
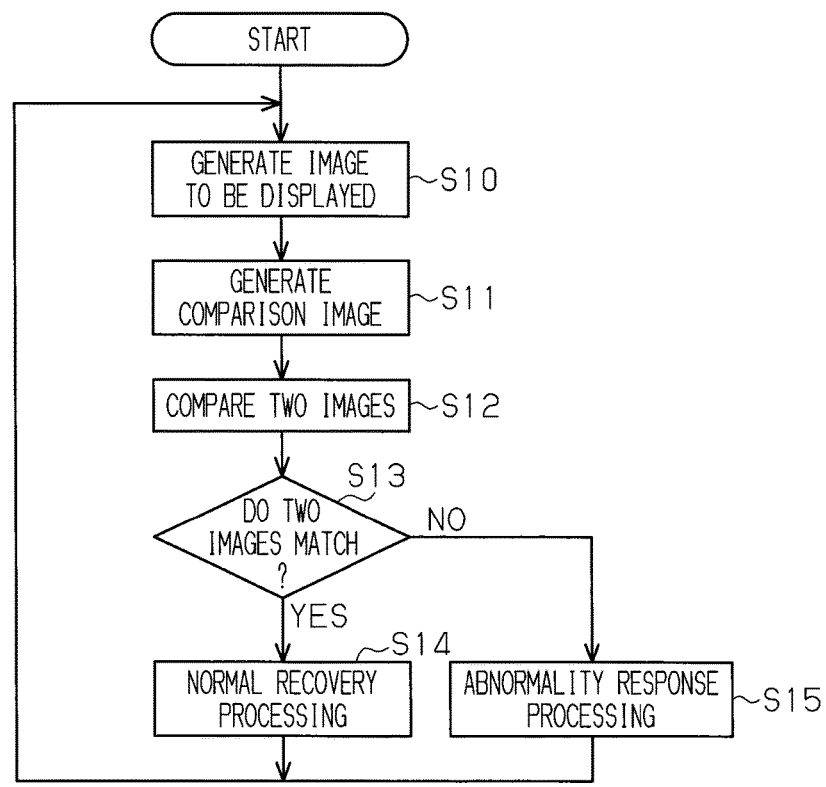

INFORMATION PROCESSING DEVICE AND
INFORMATION PROCESSING METHOD

TECHNICAL FIELD

The present invention relates to an information processing device and an information processing method that have an operation verification function for a retained program or a program introduced from the outside and execute the program.

BACKGROUND ART

As is known, a vehicle is often equipped with information processing devices, such as a navigation system and various types of control devices. Each function of a program (e.g., an application program) retained or installed in such an information processing device is required to continue being appropriately executed. For this reason, for example, a technique for verifying the operation of a program to be executed by an information processing device has been proposed. An example of the technique is disclosed in Patent Document 1.

The device disclosed in Patent Document 1 is an image formation device (MFP) as a device provided with a function of performing operation verification of an updated program. The image formation device includes a storage section, which stores a program, an execution section, which executes a program, and a control section, which checks the operation of an updated program. When a program stored in the storage section is executed after the program is updated, the control section performs operation verification of an executed function of the program. With the operation verification, it is verified whether the update of the program has been normally completed.

PRIOR ART DOCUMENTS

Patent Documents

Patent Document 1: Japanese Laid-Open Patent Publication No. 2009-187377

SUMMARY OF THE INVENTION

Problems that the Invention is to Solve

In recent years, the processing load on an information processing device executing a program that provides functions has inevitably increased with, e.g., sophistication of the functions provided through the program. Some processes temporarily increase in processing load depending on execution conditions. Such a temporary increase in processing load, in particular, may cause a decrease in the program processing speed of an information processing device and cause a delay or the like in functions provided by the program.

Although some of the above-described provided functions are allowed to be delayed for some time, a program for a vehicle has a function that is not allowed to be delayed by a prescribed amount or larger, such as a speedometer displayed on a meter display. For such a function not allowed to be delayed, it is desirable to successively monitor the processing speed of a program for a decrease. The device disclosed in Patent Document 1 merely verifies whether functions built into a program are fulfilled, i.e., the operation of the program by executing the updated program. That is, the device cannot verify a delay or the like in a program being executed in a so-called dynamic manner. Such a problem is not limited to a program for a vehicle and is mostly common to programs having built-in functions that are not allowed to be delayed by a prescribed amount or larger.

The present invention has been made in consideration of the above-described circumstances, and its object is to provide an information processing device and an information processing method capable of dynamically performing operation verification of a function of a program being executed on an as-needed basis.

Means for Solving the Problems

To achieve the foregoing objective and in accordance with one aspect of the present invention, an information processing device for operation verification of a function provided on the basis of execution of a program by an arithmetic unit is provided. A piece of data to be provided by the function is stored in a storage device. The operation verification of the function provided on the basis of execution of the program by the arithmetic unit is performed on the basis of comparison of a piece of data that is generated on the basis of execution of the program with the piece of data stored in the storage device.

To achieve the foregoing objective, and in accordance with one aspect of the present invention, an information processing method for operation verification of a function provided on the basis of execution of a program by an arithmetic unit is provided. The method includes storing a piece of data to be provided by the function in a storage device in advance and performing the operation verification of the function provided on the basis of execution of the program by the arithmetic unit on the basis of comparison of a piece of data that is generated on the basis of execution of the program with the piece of data stored in advance in the storage device.

According to the above-described configuration or method, the operation of a function that is provided through execution of a program is verified on the basis of comparison of a piece of data that is generated on the basis of execution of the program with a piece of data to be provided by the function (e.g., the presence or absence of a difference between the pieces of data). That is, operation verification of the function provided by the program being executed on the basis of the piece of data generated by the program being executed is dynamically performed on an as-needed basis.

A process of comparing two pieces of image data (e.g., a process of detecting the presence or absence of a difference) is a process that can be easily performed at high speed. For this reason, the above-described configuration or method can curb an increase in the processing load of function operation verification if the function operation verification is based on comparison between two pieces of data, a piece of data that is generated on the basis of execution of a program and a piece of data to be provided by a function of the program. If the comparison is simple comparison processing, such as detection of the presence or absence of a difference, the comparison can be implemented by a hardware circuit. Use of a hardware circuit for such comparison processing makes it possible to perform operation verification of a provided function at high speed while minimizing an increase in the load on an arithmetic unit.

Even if an arithmetic unit performs software processing, operation verification of a provided function can be performed on the basis of comparison between two pieces of data using, for example, pattern recognition processing.

In accordance with a preferable configuration, the program is a program that is introduced from the outside, and the piece of data to be provided by the function is introduced simultaneously with introduction of the program and is stored in the storage device.

In accordance with a preferable method, if a program that is introduced from the outside is used as the program, the piece of data to be provided by the function is introduced simultaneously with introduction of the program and is stored in the storage device.

According to the above-described configuration or method, a piece of data to be provided by a function is introduced into a storage device simultaneously with introduction of a program that provides the function, and the function can be immediately verified at the time of execution of the program. This allows quick function verification.

In accordance with a preferable configuration, the program is a program that is introduced from the outside, and the piece of data to be provided by the function is created upon execution of the introduced program by the arithmetic unit and is stored in the storage device.

In accordance with a preferable method, if a program that is introduced from the outside is used as the program, the piece of data to be provided by the function is created upon execution of the introduced program by the arithmetic unit and is stored in the storage device.

According to the above-described configuration or method, since a piece of data to be provided by a function is created by an arithmetic unit according to an introduced program, a piece of data to be provided by a function can be prepared for any program. Thus, an information processing device can perform operation verification on many programs on the basis of data generated upon execution of the programs.

In accordance with a preferable configuration, the piece of data generated on the basis of execution of the program is arranged in a specific storage area of the storage device. The piece of data to be provided is arranged in a comparison storage area of the storage device, and the comparison is performed through a bitwise operation between the piece of data arranged in the specific storage area of the storage device and the piece of data arranged in the comparison storage area.

In accordance with a preferable method, the piece of data generated on the basis of execution of the program is arranged in a specific storage area of the storage device. The piece of data to be provided is arranged in a comparison storage area of the storage device, and the comparison is performed through a bitwise operation between the piece of data arranged in the specific storage area of the storage device and the piece of data arranged in the comparison storage area.

According to the above-described configuration or method, comparison between a piece of data that is arranged in a specific storage area and a piece of data that is arranged in a comparison storage area can be performed through a bitwise operation between the two pieces of data, i.e., comparison between bits. It is thus easy to implement such comparison processing with a hardware circuit.

In accordance with a preferable configuration, the piece of data to be provided by the function and the piece of data generated on the basis of execution of the program are each a piece of image data.

According to the above-described configuration, operation verification of a function of outputting a piece of image data upon execution of a program can be performed on the basis of a piece of image data that is output by the function. By keeping an inappropriate piece of image data from being displayed on the basis of operation verification of a provided function, a piece of image data is prevented from giving a user a sense of anxiety or discomfort and misleading the user.

The priority given to image processing among processes to be executed by an arithmetic unit is often set to be low. Since image processing is more likely to be affected by a decrease in the processing speed of an arithmetic unit, the above-described operation verification is of great use to a function of outputting a piece of image data.

Additionally, since image processing is more likely to be affected by, e.g., a decrease in the processing speed of an arithmetic unit, as described above, an abnormality occurring in, e.g., the processing speed of the arithmetic unit is expected to be detected without delay.

In accordance with a preferable configuration, the information processing device is provided in a vehicle together with the arithmetic unit.

According to the above-described configuration, a function provided in a vehicle can be diagnosed on the basis of a piece of data that is generated on the basis of execution of a program that provides the function. A function provided to a vehicle is often required to have high accuracy and high immediacy, and such a function can maintain high accuracy and high responsiveness.

In accordance with a preferable configuration, each piece of image data includes a piece of data indicative of a speedometer that has a data part varying according to a speed of the vehicle.

According to the above-described configuration, the above-described operation verification allows a speedometer to be displayed in a vehicle to suitably ensure high accuracy and high responsiveness.

In accordance with a preferable configuration, a comparison area for the piece of data generated on the basis of execution of the program and the piece of data to be provided, which are compared at the time of the operation verification, is defined by a piece of mask data.

According to the above-described configuration, a data part unnecessary for operation verification can be excluded from operation verification. That is, partial data unnecessary for operation verification included in a piece of data that is generated on the basis of execution of a program can be prevented from affecting the operation verification. This allows more suitable conduct of function operation verification and allows provision of flexibility to function operation verification. Thus, the convenience and the design flexibility of such an information processing device are improved.

For example, settings can be made such that a data part that varies according to the speed of a vehicle is excluded from a comparison area for a speedometer of the vehicle by applying such a piece of mask data to the speedometer. In the case of the speedometer, a part that varies according to the speed is excluded from the comparison area (e.g., an image of a needle pointing to a numerical value of the speed is excluded). In other words, by comparing parts without variation, it can be detected whether varying partial data (e.g., a numeral value pointed to by the needle indicating a speed value) falls within a predetermined range defined by legislation or the like. That is, operation verification can be performed in terms of whether an indication of speed of the speedometer is appropriate. As described above, operation verification of even a function related to display of the speedometer, for which a variation exceeding a prescribed error is not allowed, can be performed with high accuracy in real time in the vehicle in terms of whether the operation of the function is appropriate or not.

In accordance with a preferable configuration, the information further includes a recovery section that brings about a recovery from an abnormality occurring in the program. If a result of comparison in the operation verification shows a difference, a recovery from the abnormality occurring in the program is brought about through the recovery section.

According to the above-described configuration, as a result of operation verification, it is possible to bring about a recovery from an abnormality occurring in a program on the basis of the presence of a difference between a piece of data that is generated on the basis of execution of the program and a piece of data to be provided by a function. For example, if an overload occurs in an arithmetic unit, suspension of execution of some programs or switching to a program with a low load can be performed. For example, if there is no harm in resetting, an arithmetic unit or the like may be reset. That is, early detection of an abnormality in a program through function operation verification allows a quick response for restoration of the program to normal and increases the possibility of eliminating the abnormality.

BRIEF DESCRIPTION OF THE DRAWINGS

FIG. 6 is a schematic view showing a manner of comparison of pieces of image data in the information processing device shown in FIG. 1, where sections (a), (b), and (c) are a schematic view respectively showing a piece of data that is created on the basis of execution of a program, a schematic view showing a piece of data to be provided by a function, and a schematic view showing a result of comparing the two pieces of data;

FIG. 7 is a flowchart showing the procedure for operation verification in the information processing device shown in FIG. 1.

MODES FOR CARRYING OUT THE INVENTION

An information processing system including an information processing device according to one embodiment the present invention will be described below with reference to the drawings.

Figure 1:
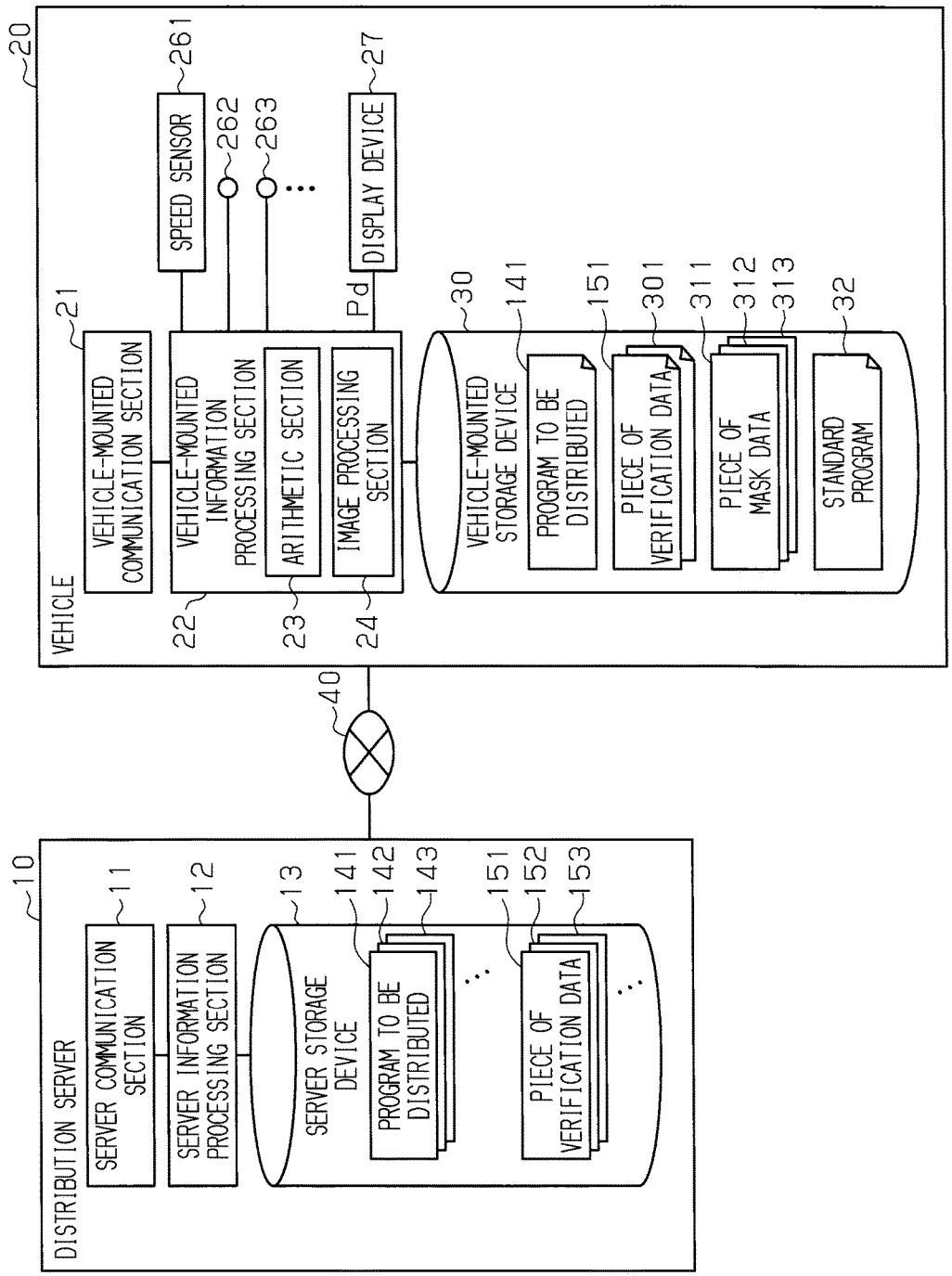
FIG. 1 is a block diagram showing a schematic configuration of an information processing system including an information processing device according to one embodiment of the present invention.

As shown in FIG. 1, an information processing system is provided with a distribution server 10 as fixed equipment, a vehicle 20 as a movable body, and a communication network 40, which connects the distribution server 10 and the vehicle 20 to each other such that they can communicate with each other.

The communication network 40 is a public network (e.g., the Internet) or the like and may include a form using wired communication or wireless communication.

The distribution server 10 is provided outside the vehicle 20 and provides various types of information to the vehicle 20. For this reason, the distribution server 10 can provide a program, data, and the like as various types of information in response to a request from the vehicle 20. Examples of the distribution server 10 may include a server that distributes road traffic information and a server that provides service only to specific customers. The distribution server 10 is provided with a server communication section 11, which allows communication with the vehicle 20 via the communication network 40, a server information processing section 12, which performs various types of processing required for distribution of various types of information and communication-related processing, and a server storage device 13, which retains various types of information distributed through distribution processing by the server information processing section 12.

The server communication section 11 is connected (e.g., bus-connected) to the server information processing section 12 to be capable of data communication with the server information processing section 12 and is configured to be capable of mutual data communication with the vehicle 20 via the communication network 40. That is, the server communication section 11 is capable of transmitting data input from the server information processing section 12 to the vehicle 20 and outputting data received from the vehicle 20 to the server information processing section 12. Although the server communication section 11 is connected to the communication network 40 with wires, the server communication section 11 may be connected through wireless communication including a mobile phone or the like.

The server information processing section 12 is mainly composed of a microcomputer including a CPU, which executes various types of arithmetic processing, a ROM, which stores various types of control programs, a RAM, which is used as a work area for data storage and program execution, and a readable and writable nonvolatile internal storage device. Various types of programs and various types of parameters used for control of information distribution to the vehicle 20 are stored in advance in the ROM and the internal storage device. Various types of information are distributed to the vehicle 20 on the basis of execution of the various types of programs including the various types of parameters by the CPU.

The server storage device 13 is composed of a hard disk drive (HDD) as a readable and writable nonvolatile storage device and the like and is connected (e.g., bus-connected) to the server information processing section 12 to be capable of data transfer to and from the server information processing section 12. Programs 141 to 143 to be distributed, pieces of verification data 151 to 153, which are various types of pieces of information distributed to the vehicle 20 through distribution control executed by the server information processing section 12, and the like are stored in the server storage device 13. Various types of programs to be executed by the server information processing section 12, various types of parameters, and the like may also be stored in the server storage device 13.

Figure 2:
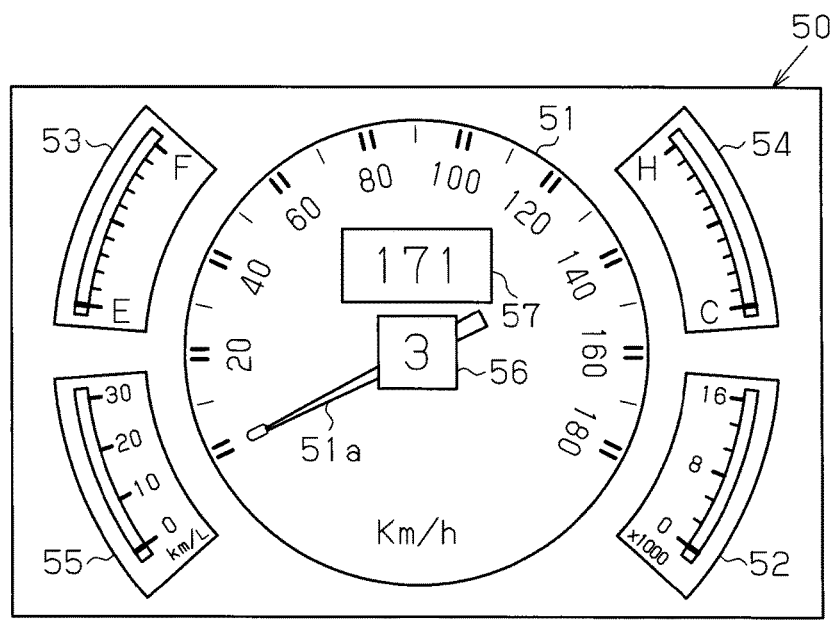
FIG. 2 is a schematic view showing an image that is displayed on the basis of a piece of image data to be verified by the information processing device shown in FIG. 1.

The programs 141 to 143 to be distributed are each a program that provides a predetermined function to the vehicle 20 by being executed in the vehicle 20, i.e., a so-called application program and a program that is introduced into (installed in) the vehicle 20 from the distribution server 10 via the communication network 40 in response to an arbitrary selection by a user. For example, the program 141 to be distributed is a program for meter display that has a function of displaying instruments, such as a speedometer, on a meter display of a vehicle and generates a piece of image data for displaying a meter image 50 as shown in FIG. 2 on a meter display (a display device 27) of the vehicle 20 on the basis of execution in the vehicle 20. The meter image 50 includes, for example, indications of a speedometer 51, a tachometer 52, a fuel gauge 53, a water temperature gauge 54, and a fuel consumption indicator 55, and the indication of the speedometer 51 includes a gear indication 56 and an indication of an odometer 57.

The pieces of verification data 151 to 153 are pieces of image data that the programs 141 to 143 to be distributed executed by the vehicle 20 are to generate on the basis of their functions. For example, the piece of verification data 151 is a piece of image data corresponding to the meter image 50, which is an image based on a piece of image data that the program 141 to be distributed is to generate. One or a plurality of pieces of data is stored in the piece of verification data 151 while being of a small data size reduced by a data compression method, such as hashing. The piece of verification data 151 may be a piece of image data that is formed from data corresponding to the whole of the meter image 50 or may be a piece of image data that is formed from data corresponding to a part of the meter image 50 as long as the piece of verification data 151 can be used for verification. The other pieces of verification data 152 and 153 may be pieces of data that correspond to the meter image 50 and are different in a numerical value pointed to by a needle 51a of the speedometer 51 from the piece of verification data 151 or may be pieces of data that correspond to images different from the meter image 50 and pieces of image data that the programs 142 and 143 to be distributed are to generate.

The vehicle 20 is a movable body, such as an automobile, which is driven through a driver's driving operation. The vehicle 20 is provided with a vehicle-mounted communication section 21, which allows communication with the distribution server 10, a vehicle-mounted information processing section 22, which performs various types of processing required to provide driving support to the driver, and a vehicle-mounted storage device 30, which retains data and the like used for the various types of processing in the vehicle-mounted information processing section 22. The vehicle 20 is also provided with a speed sensor 261, which detects speed as a vehicle condition, various types of sensors 262 and 263, which detect other vehicle conditions, and the display device 27, i.e., a so-called meter display, which receives a piece of display data Pd from the vehicle-mounted information processing section 22 and displays instruments, such as a speedometer, to be referred to by the driver (e.g., the meter image 50).

The speed sensor 261 detects the speed of the vehicle 20 and inputs a signal corresponding to the detected speed to the vehicle-mounted information processing section 22. Similarly, the various types of sensors 262 and 263 input detected vehicle conditions to the vehicle-mounted information processing section 22. That is, the vehicle-mounted information processing section 22 can perform various types of processing on the basis of signals input from the speed sensor 261 and the various types of sensors 262 and 263.

The vehicle-mounted communication section 21 is connected (e.g., bus-connected) to the vehicle-mounted information processing section 22 to be capable of data communication with the vehicle-mounted information processing section 22 and is configured to be capable of mutual data communication with the distribution server 10 via the communication network 40. That is, the vehicle-mounted communication section 21 transmits data input from the vehicle-mounted information processing section 22 to the distribution server 10 and outputs data received from the distribution server 10 to the vehicle-mounted information processing section 22. Although the vehicle-mounted communication section 21 is connected to the communication network 40 through wireless communication including a mobile phone or the like, the vehicle-mounted communication section 21 may be connected with wires while the vehicle 20 is at a stop.

The vehicle-mounted storage device 30 is composed of an HDD, a solid state drive (SSD), or the like as a readable and writable nonvolatile storage device and is connected (e.g., bus-connected) to the vehicle-mounted information processing section 22 to be capable of data transfer to and from the vehicle-mounted information processing section 22. The vehicle-mounted storage device 30 stores various types of information used by a program executed in the vehicle-mounted information processing section 22, and the like. Various types of programs to be executed by the vehicle-mounted information processing section 22 and various types of parameters may be stored in the vehicle-mounted storage device 30.

The vehicle-mounted storage device 30 is also provided with the program 141 to be distributed that is distributed from the distribution server 10 and the piece of verification data 151 and a piece of verification data 301, various types of pieces of mask data 311, 312, and 313, which define image data diagnostic areas, and a standard program 32, which is provided in advance in the vehicle 20.

The program 141 to be distributed is a program that is distributed from the distribution server 10 and is a program that is acquired by a user of the vehicle 20 through an arbitrary selection among programs stored in the distribution server 10 in order to be executed in the vehicle 20.

The piece of verification data 151 is a piece of verification data that is distributed from the distribution server 10 together with the program 141 to be distributed when the program 141 to be distributed is acquired from the distribution server 10. The piece of verification data 151 is a piece of data used for sequential operation verification of functions provided by the executed program 141 to be distributed. The piece of verification data 301 is a piece of data that is generated by the vehicle-mounted information processing section 22 and stored when the program 141 to be distributed is executed for the first time (e.g., a self-test is performed) after being acquired from the distribution server 10. The distributed piece of verification data 151 is preferentially used in the present embodiment.

Figures 3A, 3B, 3C:
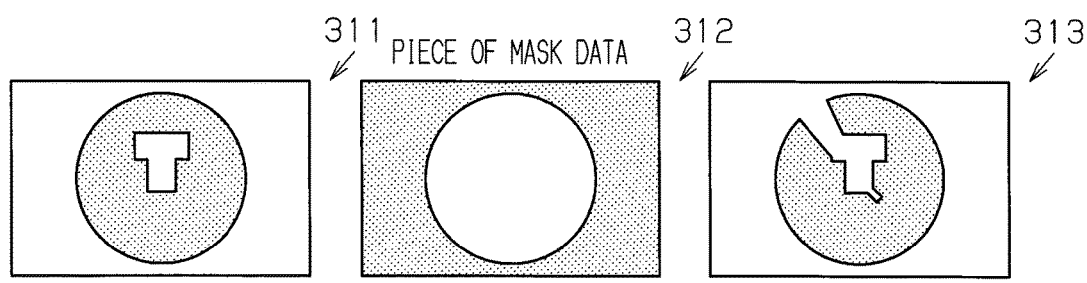
FIG. 3 is a schematic view showing pieces of mask data that define verification ranges in the information processing device shown in FIG. 1, where sections (a), (b), and (c) are schematic views showing examples, respectively, of a verification range.

The various types of pieces of mask data 311, 312, and 313 are pieces of data that define predetermined areas for image data, as shown in FIGS. 3(a), 3(b), and 3(c). In the present embodiment, the pieces of mask data 311, 312, and 313 are pieces of data that are used to set a comparison area for a piece of image data output by the program 141 to be distributed and the piece of verification data 151. For example, the piece of mask data 311 is a piece of data that defines a range corresponding to a display area for the speedometer 51 of the meter image 50, and a part in FIG. 3(*a*) that is left after an area corresponding to the gear indication 56 and the odometer 57 is removed from a circle and a part inside the circle is set to 1 (true) (a filled part in FIG. 3(*a*)). A part that consists of a part outside the circle and the area corresponding to the gear indication 56 and the odometer 57 is set to 0 (false) (a blank part in FIG. 3(*a*)). The piece of mask data 312 is a piece of data that defines a range excluding the display area for the speedometer 51 of the meter image 50. In FIG. 3(*b*), a circle and a part inside the circle are set to 0 (false) (a blank part in FIG. 3(*b*)), and a part outside the circle is set to 1 (true) (a filled part in FIG. 3(*b*)). The piece of mask data 313 is a piece of data that defines the display area for the speedometer 51 in the meter image 50 except for an area where the needle pointing to a speed value is arranged when the speed is a specific speed (e.g., an area where the needle pointing to a value of 60 km/h is arranged when the speed is 60 km/h). That is, in FIG. 3(*c*), a part that is left after a cutout where the needle 51*a* is arranged is removed from the area of 1 in the piece of mask data 311 is set to 1 (true) (a filled part in FIG. 3(*c*)), and a part that is a combination of the area of 0 in the piece of mask data 311 and the cutout where the needle 51*a* is arranged is set to 0 (false) (a blank part in FIG. 3(*c*)). The various types of pieces of mask data 311, 312, and 313 are created by the vehicle-mounted information processing section 22 and are stored in the present embodiment. Since the pieces of mask data 311, 312, and 313 define comparison areas, the number of pieces of data included in the piece of verification data 151 can be made smaller.

Figure 4:
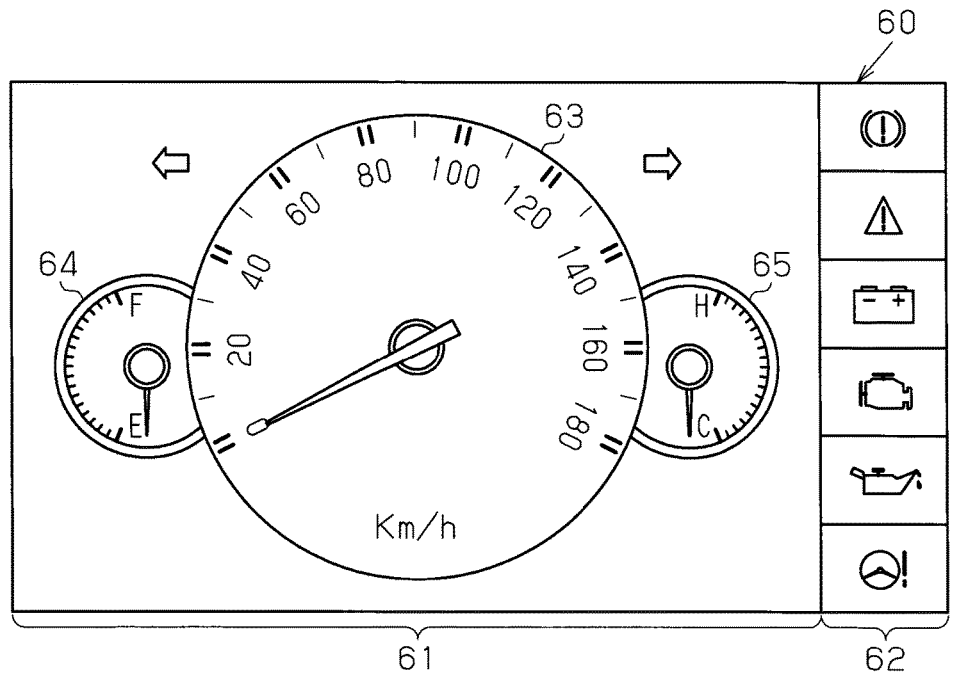
FIG. 4 is a schematic view showing a piece of image data that is generated by a program included as standard in the information processing system shown in FIG. 1.

The standard program 32 is a program that is provided in advance in the vehicle 20, i.e., a so-called standard program. The standard program 32 is a program that can provide a function of outputting an image with indications of minimum required instruments with a low load and has been subjected to operation verification in an automobile manufacturer and the like. In the present embodiment, as shown in FIG. 4, the standard program 32 provides a piece of image data corresponding to a standard meter image 60 when being executed by the vehicle-mounted information processing section 22. The processing load of the standard program 32 on the vehicle-mounted information processing section 22 is lower than that of the program 141 to be distributed. A meter display area 61 and an indicator lamp area 62 are provided in the standard meter image 60. Respective images of a speedometer 63, a fuel gauge 64, and a water temperature gauge 65 are displayed in the meter display area 61 while respective images of various types of warning lamps and indicator lamps are displayed in the indicator lamp area 62. The vehicle-mounted information processing section 22 is configured such that the standard program 32 is always executed except when pieces of alternate image data are provided for the meter display area 61 and the indicator lamp area 62. In the present embodiment, a piece of image data (the meter image 50) generated by the executed program 141 to be distributed is provided as a piece of alternate image data for the meter display area 61 of the standard meter image 60.

The vehicle-mounted information processing section 22 is a device for performing various types of control and the like required for various types of driving support provided to a driver who drives the vehicle 20. The vehicle-mounted information processing section 22 is provided with an arithmetic section 23 as a recovery section that executes various types of programs, and an image processing section 24 as the recovery section that subjects a piece of image data generated as a result of executing a program to predetermined processing.

The arithmetic section 23 is mainly composed of a microcomputer including a CPU, which executes various types of arithmetic processing, a ROM, which stores various types of control programs, and a RAM, which is used as a work area for data storage and program execution. Various types of programs and various types of parameters for performing various types of control required for various types of driving support provided by the vehicle 20 are stored in advance in the ROM. The various types of driving support are provided to the vehicle 20 on the basis of execution of a program 231 for various types of control by the CPU, which includes various types of parameters.

Figure 5:
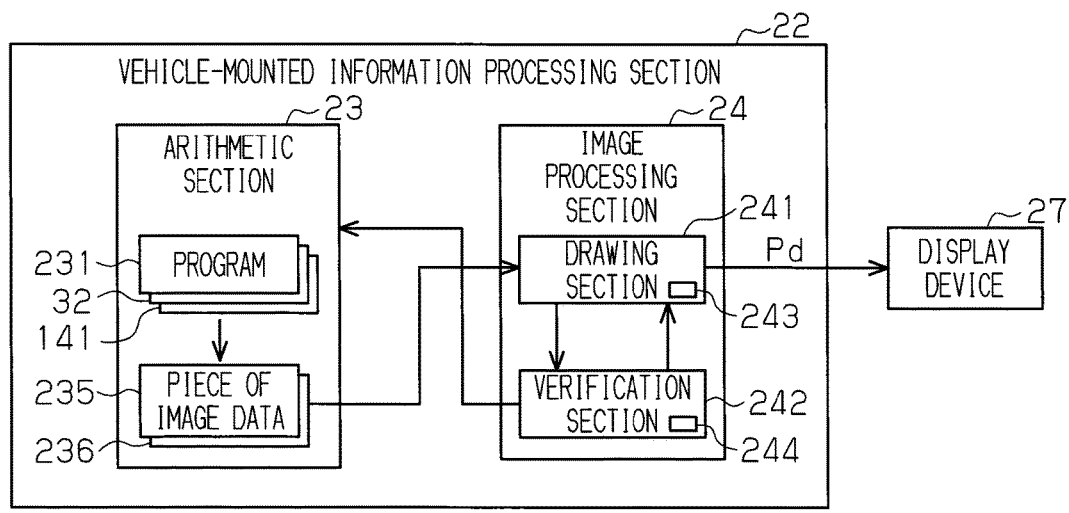
FIG. 5 is a block diagram showing the schematic configuration of a vehicle-mounted information processing section shown in FIG. 1.

In the present embodiment, as shown in FIG. 5, the arithmetic section 23 loads and executes the standard program 32 stored in the vehicle-mounted storage device 30 to generate a piece of standard image data 235 corresponding to the standard meter image 60 and loads and executes the program 141 to be distributed to generate a piece of arbitrary image data 236 corresponding to the meter image 50. In the arithmetic section 23, the priorities for control of execution of a plurality of programs are set such that the program 231 for control has the highest priority, the standard program 32 has the second highest priority, and such that the program 141 to be distributed has the lowest priority. When the processing load on the arithmetic section 23 increases, the processing speeds of all processes decrease in any way, and the processing speed of the program 141 to be distributed with a low priority, in particular, decreases significantly.

For the speedometer 63, the standard program 32 generates a piece of image data with a changed value pointed to by a needle on the basis of the speed of the vehicle 20 input from the speed sensor 261. The standard program 32 also changes values pointed to by a needle of the fuel gauge 64 and a needle of the water temperature gauge 65 on the basis of signals from the sensors (262 and 263). Since the standard program 32 can separately generate a piece of image data for the meter display area 61 and a piece of image data for the indicator lamp area 62, the standard program 32 does not generate a piece of image data corresponding to the meter display area 61 and generates only a piece of image data corresponding to the indicator lamp area 62, provided that the program 141 to be distributed provides a piece of alternate image data. That is, the piece of standard image data 235 is constructed only from a piece of image data corresponding to the indicator lamp area 62 upon execution of the standard program 32.

The program 141 to be distributed generates a piece of image data for the speedometer 51 to change a value pointed to by the needle 51*a* on the basis of the speed of the vehicle 20 input from the speed sensor 261. That is, the piece of arbitrary image data 236 is a piece of image data corresponding to the speedometer 51 showing the needle 51*a* pointing to a speed corresponding to the speed of the vehicle 20. Since the speed of the vehicle 20 is 0 km/h when the vehicle 20 is at a stop, a piece of image data is generated such that the needle 51*a* points to 0 km/h. The program 141 to be distributed also changes values pointed to by a needle of the tachometer 52, a needle of the fuel gauge 53, a needle of the water temperature gauge 65, and a needle of the fuel consumption indicator 55 on the basis of signals from the sensors (262 and 263) and the like.

The pieces of image data 235 and 236 thus created are output from the arithmetic section 23 to the image processing section 24. The standard program 32 may be configured to generate both of a piece of image data for the meter display area 61 and a piece of image data for the indicator lamp area 62. In this case, use of the piece of image data corresponding to the meter display area 61 may be avoided at the time of image display.

If the arithmetic section 23 receives a signal indicating that the piece of display data Pd is inappropriate from the image processing section 24, the arithmetic section 23 suspends execution of the program 141 to be distributed and generates the piece of standard image data 235 corresponding to the standard meter image 60 including the meter display area 61 and the indicator lamp area 62 through execution of the standard program 32. The arithmetic section 23 outputs the generated piece of standard image data 235 to the image processing section 24. That is, the arithmetic section 23 switches from the piece of arbitrary image data 236 for the meter image 50 by the program 141 to be distributed to the piece of standard image data 235 including a piece of data for the meter display area 61 by the standard program 32 as a fail-safe function of avoiding discontinuance of update of a speedometer displayed on the display device 27. At this time, execution of the program 141 to be distributed is suspended, which temporarily decreases the processing load on the arithmetic section 23.

The image processing section 24 is mainly composed of a microcomputer including a CPU, which executes image processing, a ROM, which stores an image processing program, and a RAM, which is used as a work area for data storage and program execution. Various types of programs and various types of parameters related to image processing are stored in advance in the ROM. The image processing section 24 is provided with a drawing section 241, which generates the piece of display data Pd, which is a piece of image data to be displayed on the display device 27, and a verification section 242, which detects whether the piece of display data Pd generated to be displayed on the display device 27 is appropriate.

The drawing section 241 is provided with an image RAM 243 as a specific storage area which is a memory where the piece of display data Pd to be output to the display device 27 can be arranged. The drawing section 241 generates the piece of display data Pd on the basis of the pieces of image data 235 and 236 input from the arithmetic section 23 and arranges the piece of display data Pd in the image RAM 243, on the basis of execution of the image processing program by the CPU. In the present embodiment, the piece of arbitrary image data 236 corresponding to the meter image 50 and the piece of standard image data 235 corresponding to the indicator lamp area 62 of the standard meter image 60 are input to the drawing section 241, and the drawing section 241 arranges a piece of image data formed by combining the pieces of image data 235 and 236 in the image RAM 243 and prepares for output to the display device 27. The drawing section 241 outputs the piece of display data Pd arranged in the image RAM 243 to the display device 27 at a predetermined update time for update of a display on the display device 27.

When the drawing section 241 receives a signal indicating that the piece Pd of display data arranged in the image RAM 243 is inappropriate from the verification section 242, the drawing section 241 stops outputting the piece of display data Pd arranged in the image RAM 243 to the display device 27 and outputs the piece of display data Pd that is generated on the basis of the pieces of image data 235 and 236 input from the arithmetic section 23 next time.

The verification section 242 is provided with a comparison RAM 244 as a comparison storage area where the piece of verification data 151 to be compared with the piece of display data Pd arranged in the image RAM 243 is to be arranged. The verification section 242 compares the piece of display data Pd arranged in the image RAM 243 with the piece of verification data 151 and determines, on the basis of the comparison, whether the piece of display data Pd arranged in the image RAM 243 is appropriate. For this reason, the verification section 242 acquires the piece of verification data 151 that is a piece of data to be displayed on the display device 27 and arranges the piece of verification data 151 in the comparison RAM 244, in concert with the arrangement of the piece of display data Pd in the image RAM 243 by the drawing section 241. The verification section 242 compares the piece of display data Pd arranged in the image RAM 243 with the piece of verification data 151 arranged in the comparison RAM 244 and determines the presence or absence of a difference between the pieces of data. The determination as to whether the piece of display data Pd is appropriate is performed through data comparison using a bitwise operation and is performed at each predetermined update time for update of the display on the display device 27.

More specifically, as shown in FIG. 6, the verification section 242 carries out the exclusive disjunction (XOR) between the piece of display data Pd (see FIG. 6(a)) arranged in the image RAM 243 and the piece of verification data 151 (see FIG. 6(b)) arranged in the comparison RAM 244 to obtain a piece of result data 245 (see FIG. 6(c)). The verification section 242 calculates a result value 246 from the logical disjunction (OR) of pieces of data of the obtained piece of result data 245 (see FIG. 6(c)). That is, if the piece of display data Pd arranged in the image RAM 243 and the piece of verification data 151 arranged in the comparison RAM 244 are identical, values included in the piece of result data 245 are all 0, and the result value 246 is 0. On the other hand, if the piece of display data Pd arranged in the image RAM 243 and the piece of verification data 151 arranged in the comparison RAM 244 are different in any point, the piece of result data 245 includes at least one 1, and the result value 246 is 1. As seen above, if 0 is obtained as the result value 246, it is determined that the piece of display data Pd arranged in the image RAM 243 and the piece of verification data 151 arranged in the comparison RAM 244 are identical. On the other hand, if 1 is obtained as the result value 246, it is determined that there is a difference between the piece of display data Pd arranged in the image RAM 243 and the piece of verification data 151 arranged in the comparison RAM 244. When it is detected that there is a difference between the two pieces of data, the verification section 242 notifies the drawing section 241 and the arithmetic section 23 that the piece of display data Pd arranged in the image RAM 243 is inappropriate.

If a piece of image data arranged in the image RAM 243 is composed only of the piece of standard image data 235 created by the standard program 32, the verification section 242 skips a process of sequentially verifying the piece of display data Pd since the operation of the standard program 32 is already verified. This decreases the processing load on the image processing section 24.

The verification section 242 defines a comparison area for the piece of display data Pd and the piece of verification data 151 with mask data. For example, if the comparison area is defined with the piece of mask data 311, an area defined by the piece of mask data 311 of the piece of display data Pd and an area defined by the piece of mask data 311 of the piece of verification data 151 are compared. The other areas are excluded from the comparison area. That is, the speedometer 51 based on execution of the program 141 to be distributed and the speedometer 51 in the piece of verification data 151 are compared. While the vehicle 20 is running, the comparison area is defined using a piece of mask data, (e.g., the piece of mask data 313), excluding an area corresponding to an arrangement position of the needle 51a, a margin of error for the arrangement position, and a needle swing (a motion blur). The piece of mask data 313 excluding the area may be created from the piece of mask data 311 according to speed. That is, in the present embodiment, the pieces of mask data 311, 312, and 313 are created at the verification section 242 in the vehicle-mounted information processing section 22.

The verification section 242 has a function of automatically creating mask data when the program 141 to be distributed is executed for the first time (e.g., a self-test is performed on the program 141 to be distributed) on the basis of the program 141 to be distributed and the piece of verification data 151. For example, the verification section 242 detects an area corresponding to the speedometer 51 from the piece of arbitrary image data 236 generated by the program 141 to be distributed, generates a piece of mask data that defines the area as a comparison area, and stores the piece of mask data in the vehicle-mounted storage device 30.

The display device 27 is provided in a dashboard in front of a driver's seat, and a display screen of the display device 27 is composed of a liquid crystal display, a fluorescent display, an LED panel, or the like. The display device 27 displays an image corresponding to the piece of display data Pd input from the vehicle-mounted information processing section 22. More specifically, the piece of display data Pd arranged in the image RAM 243 of the drawing section 241 in the image processing section 24 is input to the display device 27, and a corresponding image is displayed in response to the input piece of display data Pd. In the present embodiment, various types of meters, various types of warning lamps, and the like used for driving operation are displayed on the display device 27. That is, when the standard program 32 is being executed in the vehicle-mounted information processing section 22, for example, the standard meter image 60 is displayed on the display device 27, as shown in FIG. 4. On the other hand, when the program 141 to be distributed is being executed in the vehicle-mounted information processing section 22, the meter image 50 and an image corresponding to the indicator lamp area 62 of the standard meter image 60 are displayed on the display device 27.

Figure 8:
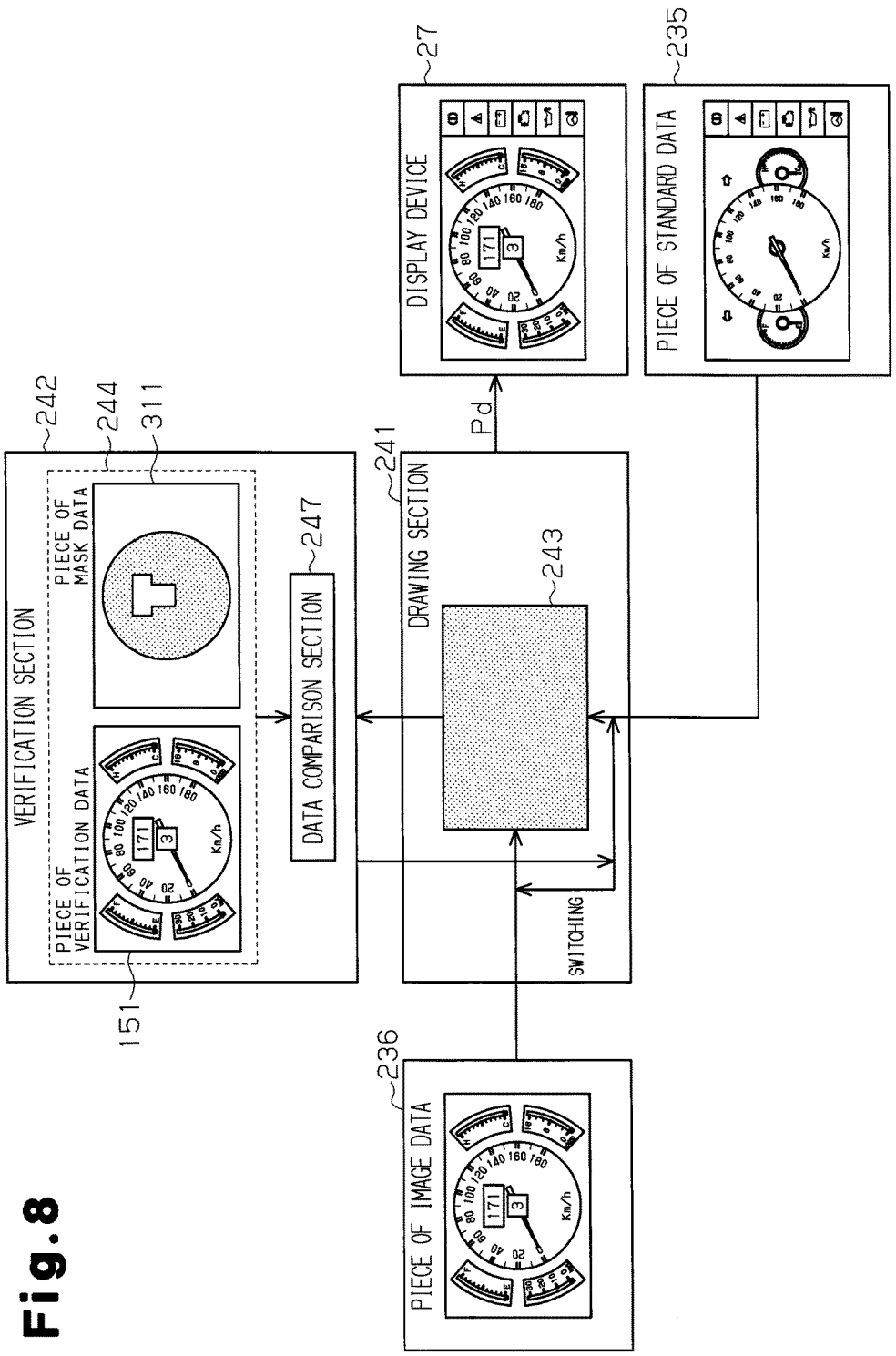
FIG. 8 is a schematic diagram showing a manner of operation verification in the information processing device shown in FIG. 1.

Operation of the information processing device will be described with reference to FIGS. 7 and 8.

When display of instruments on the display device 27 is started, the vehicle-mounted information processing section 22 generates an image to be displayed (step S10 in FIG. 7). That is, as shown in FIG. 8, the arithmetic section 23 generates the piece of arbitrary image data 236 on the basis of execution of the program 141 to be distributed and generates the piece of standard image data 235 on the basis of execution of the standard program 32. In the drawing section 241, the piece of display data Pd that is generated on the basis of the pieces of image data 235 and 236 is arranged in the image RAM 243.

As shown in FIG. 7, the vehicle-mounted information processing section 22 generates a piece of comparison image data (step S11 in FIG. 7). That is, as shown in FIG. 8, the verification section 242 acquires the piece of verification data 151 from the vehicle-mounted storage device 30 and arranges the piece of verification data 151 in the comparison RAM 244 to thereby generate (prepare) a piece of comparison image data. The piece of comparison image data can be generated (prepared) in a form adapted to a method capable of detecting the presence or absence of a difference between two pieces of image data.

As shown in FIG. 7, the vehicle-mounted information processing section 22 compares two images (step S12 in FIG. 7). That is, the vehicle-mounted information processing section 22 compares the piece of display data Pd arranged in the image RAM 243 with the piece of comparison image data arranged in the comparison RAM 244 and detects the presence or absence of a difference. That is, as shown in FIG. 8, a data comparison section 247, which is provided in the verification section 242, carries out the exclusive disjunction between the piece of image data arranged in the image RAM 243 and the piece of image data arranged in the comparison RAM 244 to obtain the piece of result data 245 (see FIG. 6).

A comparison area is limited to an area defined by the piece of mask data 311 in the present embodiment. That is, the logical conjunction (AND) of the piece of result data 245 that is a result of carrying out the exclusive disjunction between the two pieces of data and the piece of mask data 311 is calculated, thereby limiting the comparison area to the area defined by the piece of mask data 311. The logical disjunction of a piece of image data obtained from the result of calculating the logical conjunction is obtained, and the result value 246 is obtained.

As shown in FIG. 7, when the result value 246 is obtained, the vehicle-mounted information processing section 22 determines whether the two images match each other (step S13 in FIG. 7). A match between the two images is determined from the result value 246 of 0. A mismatch between the two images is determined from the result value 246 of 1.

If it is determined that the two images do not match each other, i.e., there is a mismatch (NO in step S13 in FIG. 7), the vehicle-mounted information processing section 22 performs abnormality response processing (step S15 in FIG. 7). In the abnormality response processing, required processes are carried out among, for example, suspension of the program 141 to be distributed and substitution of the standard program 32 for functions of the program 141 to be distributed, reset processing of the CPUs of the arithmetic section 23 and the image processing section 24, and the like.

On the other hand, if it is determined that the two images match each other (YES in step S13 of FIG. 7), the vehicle-mounted information processing section 22 performs normal return processing (step S14 in FIG. 7). In the normal return processing, a normal state is restored under a predetermined condition, such as a predetermined vehicle state or a predetermined lapse of time, as for the various types of processing as a response to an abnormality in processing related to image data generation in the vehicle-mounted information processing section 22. That is, a normal state which is a state before the abnormality response processing is executed is restored. If the abnormality response processing is not performed before the normal return processing, no process is performed in the normal return processing.

For example, a case will be described with reference to FIG. 8 where the speed of the vehicle 20 is 60 km/h. Assume here that the piece of verification data 151 has a piece of image data for the speedometer 51 except for an indication of the needle 51a. Since the speed is 60 km/h, the needle 51a is arranged to point to 60 in the speedometer 51 generated by the program 141 to be distributed. A piece of image data with this speedometer 51 is arranged as the piece of display data Pd in the image RAM 243. The piece of display data Pd is compared with the piece of verification data 151, thereby obtaining a piece of data indicating a data difference in an area of the needle 51a arranged to point to 60 as the piece of result data 245. At the time of determination of the piece of result data 245, the area where the needle 51a points to 60 is excluded from a comparison area by using the piece of mask data 313. That is, since it is appropriate that the needle 51a points to 60 when the speed is 60 km/h, the exclusion of the area from the comparison area does not matter. Use of the piece of mask data 313 allows detection of a case where the needle 51a is arranged in an area other than the excluded area.

As described above, comparison of the piece of display data Pd arranged in the image RAM 243 with a piece of comparison image data arranged in the comparison RAM 244 allows determination of appropriateness of the piece of image data arranged in the image RAM 243. If the piece of display data Pd arranged in the image RAM 243 is different from a piece of comparison image data arranged in the comparison RAM 244, e.g., if a value pointed to by the needle 51a of the speedometer 51 in the meter image 50 is different from a value detected by the speed sensor 261, it is estimated that there is a delay in processing in the process to arrangement of the piece of display data Pd in the image RAM 243. For example, it is estimated that there is prolongation of processing time associated with execution of the program 141 to be distributed in the arithmetic section 23, prolongation of processing time associated with image processing in the image processing section 24, or the like. Since a margin of error is defined for an indication of the speedometer 51 of the vehicle 20, a delay in processing as described above may cause the indication of the speedometer 51 to fall outside the margin of error. For this reason, the configuration is such that the piece of display data Pd is verified immediately prior to output to the display device 27. This allows determination as to whether the piece of display data Pd is appropriate or inappropriate even in a case where it is not clear where inconvenience is created.

As has been described above, the information processing system including the information processing device according to the present embodiment has the advantages listed below.

(1) The operation of a function that is provided through execution of the program 141 to be distributed is verified on the basis of comparison of the piece of display data Pd generated on the basis of execution of the program 141 to be distributed with the piece of verification data 151, which is to be provided by the function of the program 141 to be distributed (e.g., the presence or absence of a difference between the piece of verification data 151 and the piece of display data Pd). That is, operation verification of the function provided by the program 141 to be distributed being executed is dynamically performed on the basis of the piece of display data Pd generated by the program 141 to be distributed being executed on an as-needed basis, i.e., at each display update time.

A process of comparing two pieces of image data (e.g., a process of detecting the presence or absence of a difference) is a process that can be easily performed at high speed. For this reason, an increase in the processing load of function operation verification can be curbed if the function operation verification is based on comparison between two pieces of data, the piece of display data Pd generated on the basis of execution of the program 141 to be distributed and the piece of verification data 151 to be provided by a function of the program 141 to be distributed.

Even if each CPU performs software processing, operation verification of a provided function, i.e., display of the speedometer 51 and the like can be performed on the basis of comparison between two pieces of data using, for example, pattern recognition processing.

(2) Since the piece of verification data 151 that is a piece of data to be provided by a function is introduced into the vehicle 20 simultaneously with introduction of a program that provides the function into the vehicle 20, the function can be immediately verified at the time of execution of the program 141 to be distributed. This allows quick function verification.

(3) Operation verification of a function of outputting the piece of display data Pd upon execution of the program 141 to be distributed can be performed on the basis of the piece of display data Pd output by the function. By keeping the inappropriate piece of display data Pd from being displayed on the basis of operation verification of the function provided to the vehicle 20, the meter image 50 based on the inappropriate piece of display data Pd is prevented from giving a user a sense of anxiety or discomfort and misleading the user.

The priority given to image processing among processes to be executed by the vehicle-mounted information processing section 22 is often set to be low. Since image processing is more likely to be affected by, e.g., a decrease in the processing speed of the CPU of the arithmetic section 23, the above-described operation verification is of great use to the function of outputting the piece of display data Pd. Additionally, since image processing is more likely to be affected by, e.g., a decrease in the processing speed of the CPU, as described above, an abnormality occurring in, e.g., the processing speed of the CPU is expected to be detected without delay.

(4) A function provided in the vehicle 20 (e.g., the meter image 50) can be diagnosed on the basis of the piece of display data Pd generated on the basis of execution of the program 141 to be distributed that provides the function. A function provided to the vehicle 20 (e.g., the meter image 50) is required to have high accuracy and high immediacy, and a function of displaying the meter image 50 and the like can maintain high accuracy and high responsiveness.

(5) A data part unnecessary for operation verification can be excluded from operation verification by using the piece of mask data 311 (312 or 313). That is, partial data unnecessary for operation verification included in the piece of display data Pd generated on the basis of execution of the program 141 to be distributed can be prevented from affecting the operation verification. This allows more suitable conduct of function operation verification and allows provision of flexibility to function operation verification. Thus, the convenience and the design flexibility of such an information processing device are improved.

For example, the piece of mask data 311 can be applied to the speedometer 51 of the vehicle 20, and settings can be made such that a piece of data corresponding to a data part that varies according to the speed of the vehicle 20 is excluded from a comparison area for the speedometer 51. In the case of the speedometer 51, a part that varies according to the speed is excluded from the comparison area (e.g., an image of the needle 51a pointing to a numerical value of the speed is excluded). In other words, by comparing parts without variation, it can be detected whether varying partial data (e.g., a numeral value pointed to by the needle 51a indicating a speed value) falls within a predetermined range defined by legislation or the like. That is, operation verification can be performed in terms of whether an indication of speed of the speedometer 51 is appropriate. As described above, operation verification of even a function related to display of the speedometer 51, for which a variation exceeding a prescribed error is not allowed, can be performed with high accuracy in real time in the vehicle 20 in terms of whether the operation of the function is appropriate or not.

(6) As a result of operation verification, it is possible to bring about a recovery from an abnormality occurring in the program 141 to be distributed on the basis of the presence of a difference between the piece of display data Pd generated on the basis of execution of the program 141 to be distributed and the piece of verification data 151 to be provided by a function. For example, if an overload occurs in the CPU of the arithmetic section 23, suspension of execution of some programs or switching to a program with a low load can be performed. For example, if there is no harm in resetting, the CPU or the like may be reset. That is, early detection of an abnormality in the program 141 to be distributed through function operation verification allows a quick response for restoration of the program 141 to be distributed to normal and increases the possibility of eliminating the abnormality.

Other Embodiments

The above-described embodiment may be modified as follows.

Although the above-described embodiment illustrates a case where the display device 27 is provided at the dashboard in front of the driver's seat, the present invention is not limited to this. The display device 27 may be a device that displays instruments on a windshield or the like. This improves the degree of flexibility of a manner in which instruments are displayed.

Although the above-described embodiment illustrates a case where instruments are composed of an image, such as the meter image 50, the present invention is not limited to this. Some of instruments may be mechanical meters. That is, a display device may be a combination of a liquid crystal display or the like and a mechanical meter. This improves the degree of flexibility of a manner in which instruments are displayed.

The above-described embodiment illustrates a case where operation verification of the speedometer 51 is performed. The present invention, however, is not limited to this, and operation verification of display of other instruments including a tachometer, a fuel gauge, a water temperature gauge, and a fuel consumption indicator may be performed. Operation verification of a program that generates, for example, images of a warning lamp and an indicator lamp, which are pieces of image data of objects other than instruments and are pieces of data useful for being compared with a piece of verification data, can also be performed on the basis of the images. This improves the applicability of operation verification.

The above-described embodiment illustrates a case where the program 141 to be distributed is introduced from the distribution server 10. The present invention, however, is not limited to this. A program equivalent to a program to be distributed may be provided in advance in a vehicle. If a standard program is also provided in advance in the vehicle, it is possible to switch between use of a program with a high load and use of a program with a low load in the vehicle, as needed. That is, the program with a high load may be used under normal conditions, and if an abnormality or the like is sensed, the program with a low load may be used. This also improves the applicability of such a detection method.

The above-described embodiment illustrates a case where the standard program 32 is a program that is provided in advance in the vehicle 20. The present invention, however, is not limited to this, and a program corresponding to the standard program may be a program introduced from a distribution server or the like. Even in a case where the operation of a standard program is not already verified by an automobile manufacturer or the like, the standard program can also be used instead of a program to be distributed if the processing load on the standard program is low. This increases the degree of flexibility of response to operation verification in such an information processing device.

The above-described embodiment illustrates a case where the piece of verification data 151 is a piece of image data when the speed is 0 km/h or a piece of image data when the speed is 60 km/h. The present invention, however, is not limited to this. A piece of verification data may be prepared according to an image data comparison method. For example, in the case of a speedometer, a piece of verification data may be prepared for each of speeds with different needle arrangement positions (e.g., from 1 to 300 km/h in increments of 1 km/h) or only one piece of image data without a needle varying according to speed may be prepared. This improves the design flexibility of operation verification based on image data comparison.

The above-described embodiment illustrates a case where the piece of verification data 151 is introduced from the distribution server 10. The present invention, however, is not limited to this, and a piece of verification data may be created in a vehicle. For example, if a piece of verification data is not obtained from a distribution server together with a program to be distributed, an image processing section may automatically create a piece of verification data from a piece of image data that is generated by the program to be distributed when the program to be distributed is executed for the first time (e.g., a self-test is performed on the program to be distributed). For example, the piece of image data generated by the program to be distributed may be used as a piece of verification data or the piece of image data generated by the program to be distributed except for an unnecessary part may be used as a piece of verification data. In this case, since a piece of verification data to be provided by a function of a program to be distributed is created by a vehicle information processing section according to the introduced program to be distributed, a piece of verification data to be provided by a function can be prepared for any program to be distributed. Thus, an information processing device can perform operation verification on many programs on the basis of data generated upon execution of the programs. That is, the design flexibility of operation verification based on image data comparison is improved.

The above-described embodiment illustrates a case where the pieces of mask data 311, 312, and 313 are created by the verification section 242 (the vehicle-mounted information processing section 22). The present invention, however, is not limited to this, and each piece of mask data may be introduced from a distribution server. This allows operation verification of a program to be distributed immediately after introduction of the program to be distributed.

The above-described embodiment illustrates a case where the program 141 to be distributed and the piece of verification data 151 are introduced into the vehicle 20 via a communication network. The present invention, however, is not limited to this. A program to be distributed and a piece of verification data are not limited to introduction via a network and may be introduced via a storage medium, such as a CD-ROM or a USB memory. This improves the applicability of an information processing device.

The above-described embodiment illustrates a case where the vehicle 20 communicates with the distribution server 10. The present invention, however, is not limited to this. A vehicle does not necessarily need to be provided with a communication section as long as a program to be distributed and a piece of verification data that are required are provided in the vehicle. That is, a vehicle does not necessarily need to be able to communicate with a distribution server. This improves the applicability of operation verification by such an information processing device.

The above-described embodiment illustrates a case where the image processing section 24 (the verification section 242) compares the piece of display data Pd arranged in the image RAM 243 with the piece of verification data 151 arranged in the comparison RAM 244. The present invention, however, is not limited to this. A memory comparison circuit may be provided for an image RAM and a comparison RAM, and a piece of display data and a piece of verification data may be compared using the memory comparison circuit. The memory comparison circuit can be constructed from a hardware circuit if it is intended for simple comparison processing, such as detection of the presence or absence of a difference. Such a circuit is generally required to perform only a bitwise operation between a piece of data arranged in an image RAM (specific storage area) and a piece of data arranged in a comparison RAM (comparison storage area), i.e., comparison between bits and has a high processing speed. That is, since use of a hardwire circuit for such comparison processing does not affect the processing load on an image processing section, an increase in the load on a CPU can be curbed, and operation verification that is less affected by a processing load and the like can be performed as operation verification at high speed. This improves the convenience of an information processing device.

The above-described embodiment illustrates a case where the image RAM 243, in which the piece of display data Pd is arranged, and the comparison RAM 244, in which the piece of verification data 151 is arranged, are separately provided. The present invention, however, is not limited to this, and an image RAM and a comparison RAM may be one RAM. For example, an arrangement area for a piece of display data and an arrangement area for a piece of comparison data may be reserved in a RAM with a large storage area. This allows shortening of access time at the time of comparison between the two pieces of data and quicker operation verification.

The above-described embodiment illustrates a case where the arithmetic section 23 and the image processing section 24 are configured to have separate microcomputers. The present invention, however, is not limited to this, and an arithmetic section and an image processing section may be composed of one microcomputer. In contrast to this, an arithmetic section and an image processing section may be composed of more microcomputers. For example, separate microcomputers may serve as a drawing section and a verification section of an image processing section. This increases the degree of flexibility of the configuration of an information processing device.

A microcomputer used as an arithmetic section or an image processing section may be a single-core microcomputer or a multi-core microcomputer. In, e.g., a case where a multi-core microcomputer is used, and each core handles a program independently, only one core can be reset in abnormality response processing. If a processing environment where execution of a program to be distributed and execution of another program can be separated (e.g., an environment like a virtual machine that emulates the operation of a computer) is constructed, only an environment where a program to be distributed is executed can be reset. This increases the degree of flexibility of the configuration of an information processing device.

The above-described embodiment illustrates a case where the vehicle-mounted information processing section 22 executes the standard program 32. The present invention, however, is not limited to this, and execution of a standard program may be performed by another microcomputer, an electronic control section (ECU), or the like. Even in a case where inconvenience occurs in a vehicle-mounted information processing section, display of a speedometer and the like based on execution of a standard program is continued. This improves the applicability of an information processing device.

The above-described embodiment illustrates a case where determination as to whether the piece of display data Pd is appropriate, i.e., operation verification is performed at each predetermined update time for update of the display on the display device 27. The present invention, however, is not limited to this, and operation verification may be performed once every (e.g., two or three) predetermined update times. Additionally, operation verification does not necessarily need to be performed at equal intervals as long as operation verification is performed as needed. This improves the design flexibility associated with operation verification.

The above-described embodiment illustrates a case where operation verification of the program 141 to be distributed is performed on the basis of a result of comparison of the piece of display data Pd with the piece of verification data 151. The present invention, however, is not limited to this. If a verification section periodically transmits a comparison result to an arithmetic section or a drawing section, the arithmetic section or the drawing section may perform abnormality response processing when a comparison result is no longer transmitted from the verification section, i.e., when a communication timeout occurs. This achieves improvement in the design flexibility related to operation verification.

The above-described embodiment illustrates a case where an operation verification target is image data. The present invention, however, is not limited to this. An operation verification target may be informative data, such as audio data, or control data, for which time for verification can be secured, as long as a piece of verification data can be prepared. For example, in the case of audio data, audio data for a predetermined time period may be collectively verified. This improves the applicability of operation verification.

The above-described embodiment illustrates a case where the vehicle 20 is equipped with the vehicle-mounted information processing section 22 and the vehicle-mounted storage device 30. The present invention, however, is not limited to this. An information processing section and a storage device corresponding to a vehicle-mounted information processing section and a vehicle-mounted storage device may be provided in a movable body other than a vehicle, such as a ship or a robot. This improves the applicability of operation verification.

DESCRIPTION OF THE REFERENCE NUMERALS 10 distribution server
11 server communication section
12 server information processing section
13 server storage device
20 vehicle
21 vehicle-mounted communication section
22 vehicle-mounted information processing section 23 arithmetic section
24 image processing section
27 display device
30 vehicle-mounted storage device
32 standard program
40 communication network
50 meter image
51 speedometer
51a needle
52 tachometer
53 fuel gauge
54 water temperature gauge
55 fuel consumption indicator
56 gear indication
57 odometer
60 standard meter image
61 meter display area
62 indicator lamp area
63 speedometer
64 fuel gauge
65 water temperature gauge
141 to 143 program to be distributed
151 to 153 piece of verification data
231 program
235, 236 piece of image data
241 drawing section
242 verification section
243 image RAM
244 comparison RAM
245 piece of result data
247 data comparison section
261 speed sensor
262, 263 sensor
301 piece of verification data
311 to 313 piece of mask data
Pd piece of display data

The invention claimed is:

1. An information processing device, comprising:
a microcomputer including a memory circuit, a first CPU, and a second CPU, the microcomputer processing a piece of data indicative of a speedometer of a vehicle, wherein
the memory circuit is configured to store a first piece of data to be provided by the first CPU executing a program,
the second CPU is configured to perform comparison of a second piece of data that is generated on the basis of execution of the program by the first CPU with the first piece of data stored in the memory circuit,
the second CPU is configured to exclude partial data of the second piece of data generated on the basis of execution of the program from the comparison before performing the comparison by applying a piece of mask data to the second piece of data for limiting a comparison area such that the comparison is performed to compare the first piece of data with the second piece of data in which the partial data is excluded, the partial data varying according to an externally input value and the partial data including the piece of data indicative of the speedometer that has a data part varying according to a speed of the vehicle,
the piece of mask data is applied to the speedometer of the vehicle such that a piece of data corresponding to the data part that varies according to the speed of the vehicle is excluded from the comparison area,
the comparison includes an operation verification of a function related to display of the speedometer where
when the second CPU determines that the first piece of data and the second piece of data in which the partial data is excluded are different based upon the comparison, the second piece of data is determined to be inappropriate for use, and
when the second CPU determines that that the first piece of data and the second piece of data in which the partial data is excluded are not different based upon the comparison, the second piece of data is determined to be appropriate for use,
the second CPU is configured to perform the comparison at each update time for update of the second piece of data that is generated,
when the second piece of data is determined to be inappropriate for use, a standard program is substituted for the program executed by the first CPU,
when the second piece of data is determined to be appropriate for use, the second piece of data is used for displaying an image,
the first piece of data to be provided by the first CPU, and the second piece of data generated on the basis of execution of the program are each a piece of image data.

2. The information processing device according to claim 1, wherein
the program is a program that is introduced from the outside, and
the first piece of data to be provided by the first CPU is introduced simultaneously with introduction of the program and is stored in the memory circuit.

3. The information processing device according to claim 1, wherein
the program is a program that is introduced from the outside, and
the first piece of data to be provided by the first CPU is created upon execution of the introduced program by the first CPU and is stored in the memory circuit.

4. The information processing device according to claim 1, wherein
the second piece of data generated on the basis of execution of the program is arranged in a specific storage area of the memory circuit,
the first piece of data to be provided is arranged in a comparison storage area of the memory circuit, and
the comparison is performed through a bitwise operation between the second piece of data arranged in the specific storage area of the memory circuit and the first piece of data arranged in the comparison storage area.

5. The information processing device according to claim 1, wherein the information processing device is provided in a vehicle together with the first CPU.

6. The information processing device according to claim 5, wherein each piece of image data includes the piece of data indicative of the speedometer that has the data part varying according to the speed of the vehicle.

7. The information processing device according to claim 1, wherein at least one of the first and second CPU include a recovery section that is configured to bring about a recovery from an abnormality occurring in the program when the second CPU determines that the first piece of data and the second piece of data in which the partial data is excluded are different based upon the comparison.

8. The information processing device according to claim 1, wherein inappropriate for use includes inappropriate for display of the image according to the second piece of data, and appropriate for use includes appropriate for display of the image according to the second piece of data.

9. An information processing method performed by a microcomputer including a memory circuit, a first CPU, and a second CPU, the microcomputer processing a piece of data indicative of a speedometer of a vehicle, the method comprising:
- storing, by the memory circuit, a first piece of data to be provided by the first CPU executing a program in advance;
- performing, by the second CPU, comparison of a second piece of data which is generated on the basis of execution of the program by the first CPU with the first piece of data stored in advance in the memory circuit;
- excluding, by the second CPU, partial data of the second piece of data generated on the basis of execution of the program from the comparison before performing the comparison by applying a piece of mask data to the second piece of data for limiting a comparison area such that the comparison is performed to compare the first piece of data with the second piece of data in which the partial data is excluded, the partial data varying according to an externally input value; and
- performing, by the second CPU, the comparison at each update time for update of the second piece of data that is generated, wherein the partial data includes the piece of data indicative of the speedometer that has a data part varying according to a speed of the vehicle, the piece of mask data is applied to the speedometer of the vehicle such that a piece of data corresponding to the data part that varies according to the speed of the vehicle is excluded from the comparison area, performing the comparison includes an operation verification of a function related to display of the speedometer including:
- determining, by the second CPU, that the second piece of data is inappropriate for use when the second CPU determines that that the first piece of data and the second piece of data in which the partial data is excluded are different based upon the comparison, and
- determining, by the second CPU, that the second piece of data is appropriate for use when the second CPU determines that the first piece of data and the second piece of data in which the partial data is excluded are not different based upon the comparison, when the second piece of data is determined to be inappropriate for use, a standard program is substituted for the program executed by the first CPU, when the second piece of data is determined to be appropriate for use, the second piece of data is used for displaying an image, the first piece of data to be provided by the first CPU, and the second piece of data generated on the basis of execution of the program are each a piece of image data.

10. The information processing method according to claim 9, wherein, if a program that is introduced from the outside is used as the program, the first piece of data to be provided by the first CPU is introduced simultaneously with introduction of the program and is stored in the memory circuit.

11. The information processing method according to claim 10, wherein, if a program that is introduced from the outside is used as the program, the first piece of data to be provided by the first CPU is created upon execution of the introduced program by the first CPU and is stored in the memory circuit.

12. The information processing method according claim 9, wherein
- the second piece of data generated on the basis of execution of the program is arranged in a specific storage area of the memory circuit,
- the first piece of data to be provided is arranged in a comparison storage area of the memory circuit, and
- the comparison is performed through a bitwise operation between the second piece of data arranged in the specific storage area of the memory circuit and the first piece of data arranged in the comparison storage area.

13. The information processing method according to claim 9, wherein inappropriate for use includes inappropriate for display of the image according to the second piece of data, and appropriate for use includes appropriate for display of the image according to the second piece of data.

* * * * *